US008220775B2

(12) United States Patent
Bittner et al.

(10) Patent No.: US 8,220,775 B2
(45) Date of Patent: Jul. 17, 2012

(54) FLOW CONNECTOR FOR A VALVE

(75) Inventors: Joerg Bittner, Laudenbach (DE); Torsten Gerlich, Bensheim (DE); Volker Daume, Hirschhorn (DE)

(73) Assignee: Eagle Actuator Components GmbH & Co. KG, Weinheim (DE)

( * ) Notice: Subject to any disclaimer, the term of this patent is extended or adjusted under 35 U.S.C. 154(b) by 1005 days.

(21) Appl. No.: 12/148,237

(22) Filed: Apr. 17, 2008

(65) Prior Publication Data

US 2008/0265195 A1 Oct. 30, 2008

(30) Foreign Application Priority Data

Apr. 24, 2007 (DE) ......................... 10 2007 019 606

(51) Int. Cl.
*F16K 47/00* (2006.01)
*F16L 55/02* (2006.01)

(52) U.S. Cl. .................... 251/121; 251/123; 251/129.15

(58) Field of Classification Search .................. 251/118, 251/123, 129.01, 129.08, 129.15, 129.22, 251/121, 127, 124; 137/469, 472, 625.37, 137/511, 512, 513.5

See application file for complete search history.

(56) References Cited

U.S. PATENT DOCUMENTS 2,219,324 A * 10/1940 Lee .............................. 251/123
2,649,273 A * 8/1953 Honegger ..................... 251/126
3,111,138 A * 11/1963 Humphreys et al. .......... 137/480
6,666,433 B1 * 12/2003 Pierce ........................... 251/359
6,962,270 B1 * 11/2005 Barker et al. .............. 222/129.4
7,201,188 B2 * 4/2007 Baumann ................ 137/625.33

FOREIGN PATENT DOCUMENTS

DE 2130162 1/1972
DE 20108618 U1 11/2002

* cited by examiner

*Primary Examiner* — John Rivell
*Assistant Examiner* — R. K. Arundale
(74) *Attorney, Agent, or Firm* — Pearl Cohen Zedek Latzer, LLP

(57) ABSTRACT

A flow connector for a valve, including a body in which a flow channel is formed that is made up of a first port, a second port and an opening area to receive a movable plug, whereby the ports can be flow-connected through the opening area. The valve having a flow connector is configured and refined in such a way that the volume of fluid that flows through the flow channel per unit of time can be set without any problem wherein the cross section surface area of the flow channel in the opening area is configured to be constant along a first height of lift and to be variable along a second height of lift. A solenoid valve includes the flow connector according to an embodiment of the present invention.

13 Claims, 6 Drawing Sheets

1
3b
2
10
9
9
9
8
7
4
6
2
11
3a
2

FLOW CONNECTOR FOR A VALVE

CROSS-REFERENCES TO RELATED APPLICATIONS

This application claims priority to German Patent Application DE 10 2007 019 606.9, filed Apr. 24, 2007, and hereby incorporated by reference herein.

BACKGROUND OF THE INVENTION

The present invention relates to a flow connector for a valve, comprising a body in which a flow channel is formed that is made up of a first port, a second port and an opening area to receive a movable plug, whereby the ports can be flow-connected through the opening area. The invention also relates to a solenoid valve.

BACKGROUND

Flow connectors of the above-mentioned type are already known from the state of the art. They are especially employed in solenoid valves that can be actuated electromagnetically or that are electromagnetically clocked. In order to relieve an excess pressure or a negative pressure, for example, in the tank of a motor vehicle, the plug inside the flow connector is moved by an armature in such a way that the flow channel in the body is opened.

Solenoid valves are often used to vent tanks in motor vehicles. However, above a certain temperature, volatile hydrocarbons can easily escape into the atmosphere via the tank vent system. A European standard has set this emission at a certain limit value. In order to comply with this limit value, an activated-charcoal filter is normally installed in the tank venting system. This activated-charcoal filter absorbs the hydrocarbons that have escaped and only allows pure air to reach the atmosphere.

Usually, a regeneration valve is placed between the activated-charcoal filter and the intake pipe of the engine of the motor vehicle. The regeneration valve, which is normally configured as a solenoid valve, opens under certain conditions, thus allowing a regeneration of the activated-charcoal filter. The fuel vapors are sucked into the intake pipe via the regeneration valve, thus reaching the combustion chamber of the engine cylinders, where they are burned.

In the case of the proportional valves known from the state of the art, particularly flow-regulated solenoid valves, the volume of fluid that flows through the flow channel per unit of time is highly dependent on the position or height of lift of the plug. As soon as the plug is moved out of its closing position, an undesired high volume of fluid can initially flow past the plug. This has to do with the fact that the plug is initially moved too far out of its closing position, as a result of which an excessively large cross section surface area of the flow channel in the opening area is opened.

As a result of this, excessively rich mixtures can get into the engine of a motor vehicle and this, in turn, requires regulation of the solenoid valve. Within the scope of this regulation, the plug is again moved in the direction of the closing position. In this process, it is possible for the plug to be moved so far towards the closing position that the cross section surface area that is opened in the flow channel is now too small. A certain amount of time can pass until the ideal mixture is fed to the engine, namely, until the plug has moved to the correct height of lift. This "overshooting phenomenon" can be extremely detrimental for the engine.

SUMMARY OF THE INVENTION

The present invention is based on an objective of configuring and refining a valve having a flow connector of the above-mentioned type in such a way that the volume of fluid that flows through the flow channel per unit of time can be set without any problem.

A flow connector of the above-mentioned type is characterized in that the cross section surface area of the flow channel in the opening area is configured to be constant along a first height of lift and to be variable along a second height of lift.

According to the invention, it has been recognized that a constant cross section surface area along a first height of lift essentially defines the flow volume per unit of time over a certain interval of the height of lift. The first height of lift thus forms a buffer zone within which the plug can be moved with ease without the flow volume per unit of time rising too much. This effectively prevents excessively rich mixtures from being fed to an internal combustion engine. It has also been recognized according to the invention that a variable cross section surface area along a second height of lift allows the flow volume per unit of time to be adjusted via the height of lift. The combination of two height of lift intervals having different flow characteristics ingeniously solves the problem of "overshooting" normally encountered with the plug during the opening procedure. Consequently, the above-mentioned objective is achieved.

The flow channel could be configured cylindrically along a first height of lift. This concrete configuration allows the body to be manufactured easily and cost-effectively. Moreover, a cylindrical configuration can create an annular gap between the plug and the inner wall of the opening area. The first height of lift can be, for instance, 2.5 mm. This value has proven to be sufficient to effectively avoid overshooting phenomena.

The flow channel could be configured conically along the second height of lift. In concrete terms, it is conceivable for the body to have the configuration of a truncated cone in the opening area along the second height of lift. Because of its rotational symmetry, this configuration makes it easy to manufacture the body.

Guide webs that taper in at least one direction could be arranged in the opening area along the second height of lift. The arrangement of guide webs advantageously guides the plug so that any jamming or tilting thereof is ruled out almost completely. The tapering of the guide webs in at least one direction makes it possible to increase or decrease the cross section surface area of the flow channel along the second height of lift of the opening area. The tapering of the guide webs, in combination with the conical contour of the opening area along the second height of lift, allows a fine-adjustment of the cross section surface area of the flow channel.

Before this backdrop, the guide webs could taper in the axial direction. In this context, it is conceivable for the guide webs to taper in the direction of the side facing away from the first port. This translates into a continuous and gradual increase in the cross section surface area of the flow channel.

The guide webs could taper in the radial direction. In this context, it is, in fact, conceivable for the guide webs to be configured wider on the body than on the side facing the plug. Owing to this concrete configuration, the fluid flowing through the flow channel can easily flow past the wall of the plug and then through the flow channel between the guide webs.

The guide webs could have rounded-off end zones. This concrete embodiment allows the plug to easily enter the opening area. Moreover, the rounded-off end zones prevent eddies in the flow field of the fluid flowing through the flow channel.

A seat could be formed in the opening area. This concrete embodiment allows the plug to rest on the top of the first port so as to seal it. An elastomeric gasket can be associated with the seat to allow the plug to rest on the seat in a fluid-tight manner.

A plug could be movably mounted in the opening area. The plug can be moved by means of an armature. This allows the opening area to be opened or closed. Before this backdrop, it is also conceivable for the armature and the plug to be configured in one piece. This embodiment translates into a solenoid valve with few parts.

The plug could have a gasket. This concrete embodiment allows the plug to rest on the seat so as to create a seal. Before this backdrop, it is conceivable for the gasket to be made of an elastomer.

The plug could have a guide cone. This guide cone could consist of a cylindrical section and a truncated-conical section. The guide cone performs two functions. In addition to the guide webs, the guide cone also guides the plug so that the cone comes to rest on the seat without becoming jammed or tilting. In this context, the guide cone can optionally enter the first port, at least partially. The guide cone also has the function of restricting the volume of fluid that flows through the flow channel. Owing to the truncated-conical configuration of the guide cone, at first only a small volume of fluid flows past the guide cone when the flow channel is opened, and the fluid ultimately passes the plug through the annular gap.

The objective is also achieved by a solenoid valve having a flow connector as described by the present invention.

In order to avoid repetitions pertaining to the inventive activity, reference is hereby made to the elaborations regarding the flow connector as such.

The flow connector described here is employed in a solenoid valve, especially in a flow-regulated solenoid valve. The solenoid valve thus configured is particularly well-suited for use as a regeneration valve in a motor vehicle since it allows the fuel mixture to be easily adjusted.

It is likewise conceivable to use the flow connector described in the present invention in pneumatically operated valves.

Preferred configurations and refinements of the teaching will be elaborated upon in conjunction with the explanation of the preferred embodiments of the invention on the basis of the drawings.

DETAILED DESCRIPTION

Figure 1:
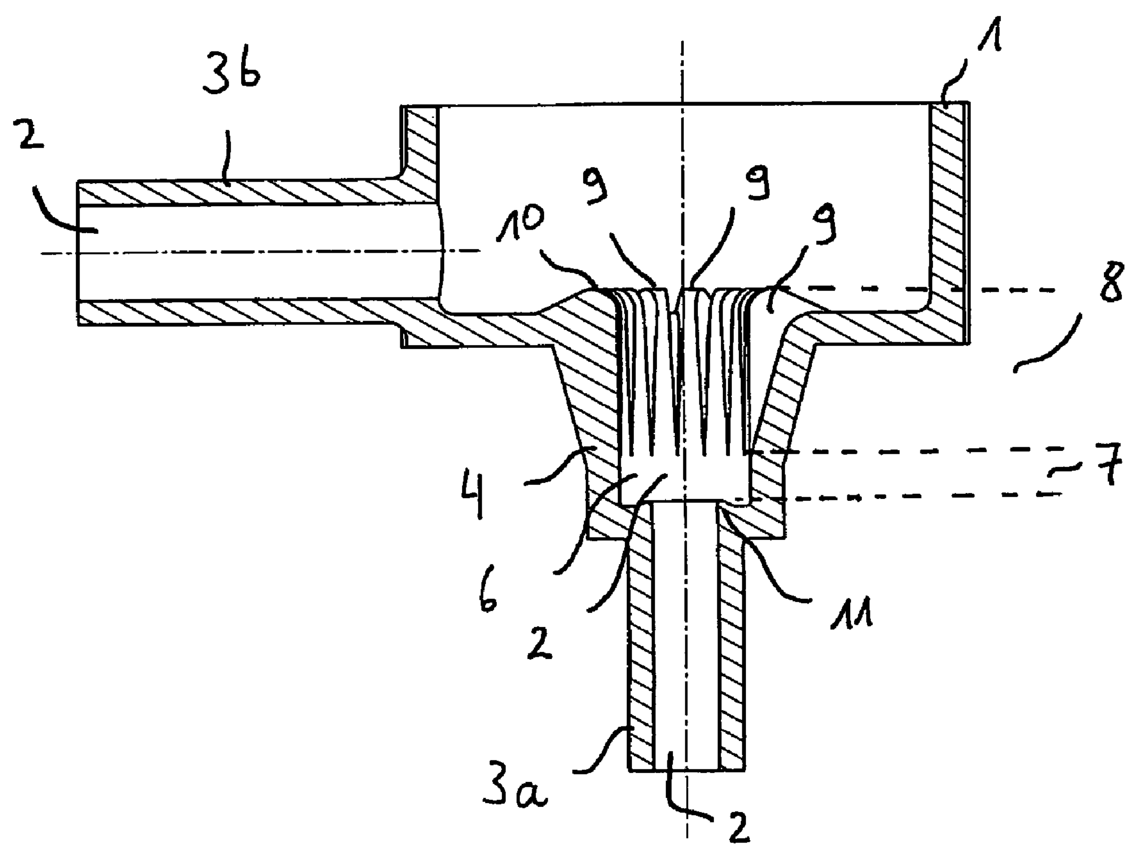
FIG. 1 shows sectional view of a flow connector in whose opening area guide webs are arranged.

FIG. 1 shows a flow connector for a valve, especially for a solenoid valve. The flow connector comprises a body 1 in which a flow channel 2 is formed that is made up of a first port 3*a*, a second port 3*b* and an opening area 4 to receive a movable plug 5. The ports 3*a*, 3*b* can be flow-connected through the opening area 4.

The cross section surface area 6 of the flow channel 2 in the opening area 4 is configured to be constant along a first height of lift 7 and forms a ring having a constant surface area. The cross section surface area 6 of the flow channel 2 in the opening area 4 is configured to be variable along a second height of lift 8. Here, the broken lines show the intervals of the first height of lift 7 and of the second height of lift 8.

The flow channel 2 is configured to be cylindrical along the first height of lift 7. The flow channel 2 is configured to be conical along the second height of lift 8. Here, the opening area 4 is configured to be cylindrical along the first height of lift 7 and is configured to be truncated conical along the second height of lift 8.

Guide webs 9 that taper in at least one direction are arranged in the opening area 4 along the second height of lift 8. The guide webs 9 taper in the axial direction, namely, towards the second port 3*b*. The guide webs also taper in the radial direction, namely, towards the receptacle of the plug 5.

The guide webs have rounded-off end zones 10 that prevent eddies in the flow field of the fluid flowing through the flow channel 2.

A seat 11 can be formed in the opening area 4 where the plug 5 can rest.

Figure 2:
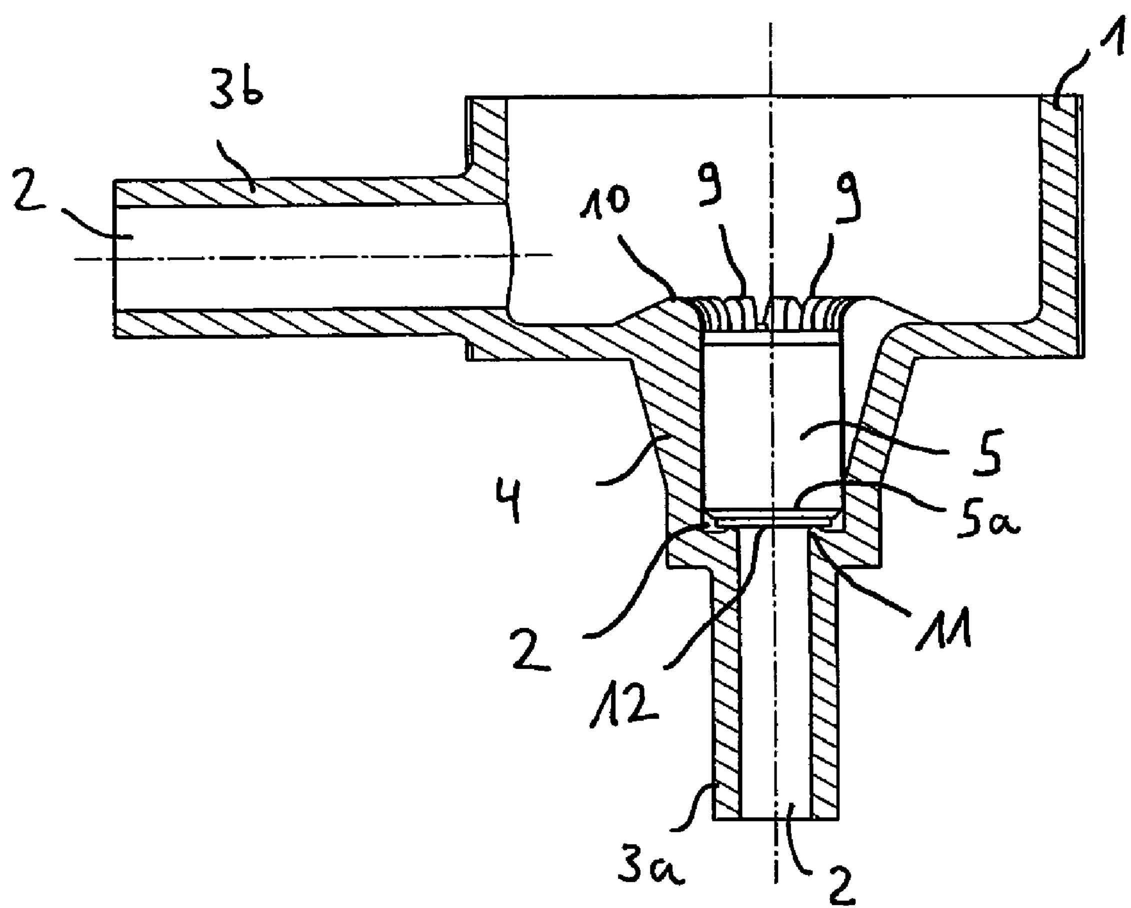
FIG. 2 shows a sectional view of the flow connector according to FIG. 1, whereby a plug is positioned in its opening area.

FIG. 2 shows a sectional view of the flow connector according to FIG. 1, whereby a movable plug 5 is positioned in the opening area 4. The plug 5 is guided by the guide webs 9 inside the opening area 4. The plug 5 comes to rest at the seat 11. A gasket 12 is positioned between the seat 11 and the plug 5.

The ports 3*a*, 3*b* are flow-connected via the opening area 4 when the plug 5 is moved in the direction of the second port 3*b*. If the plug 5 is moved along the first height of lift 7 shown in FIG. 1, an annular gap is formed between the inner wall of the opening area 4 and the outer wall of the plug 5, and the fluid can flow through this annular gap from the first port 3*a* to the second port 3*b* and vice-versa.

If the plug 5 is moved in such a manner that its lower edge 5*a* enters the interval of the second height of lift 8, the cross section surface area 6 of the flow channel 2 is enlarged by the spaces formed between the guide webs 9. As the height of lift of the plug 5 increases, the cross section surface area 6 along the second height of lift 8 is increasingly enlarged so that the flow volume of fluid per unit of time through the flow channel 2 rises almost proportionally to the height of lift of the plug 5 (also see FIG. 6).

Figure 3:
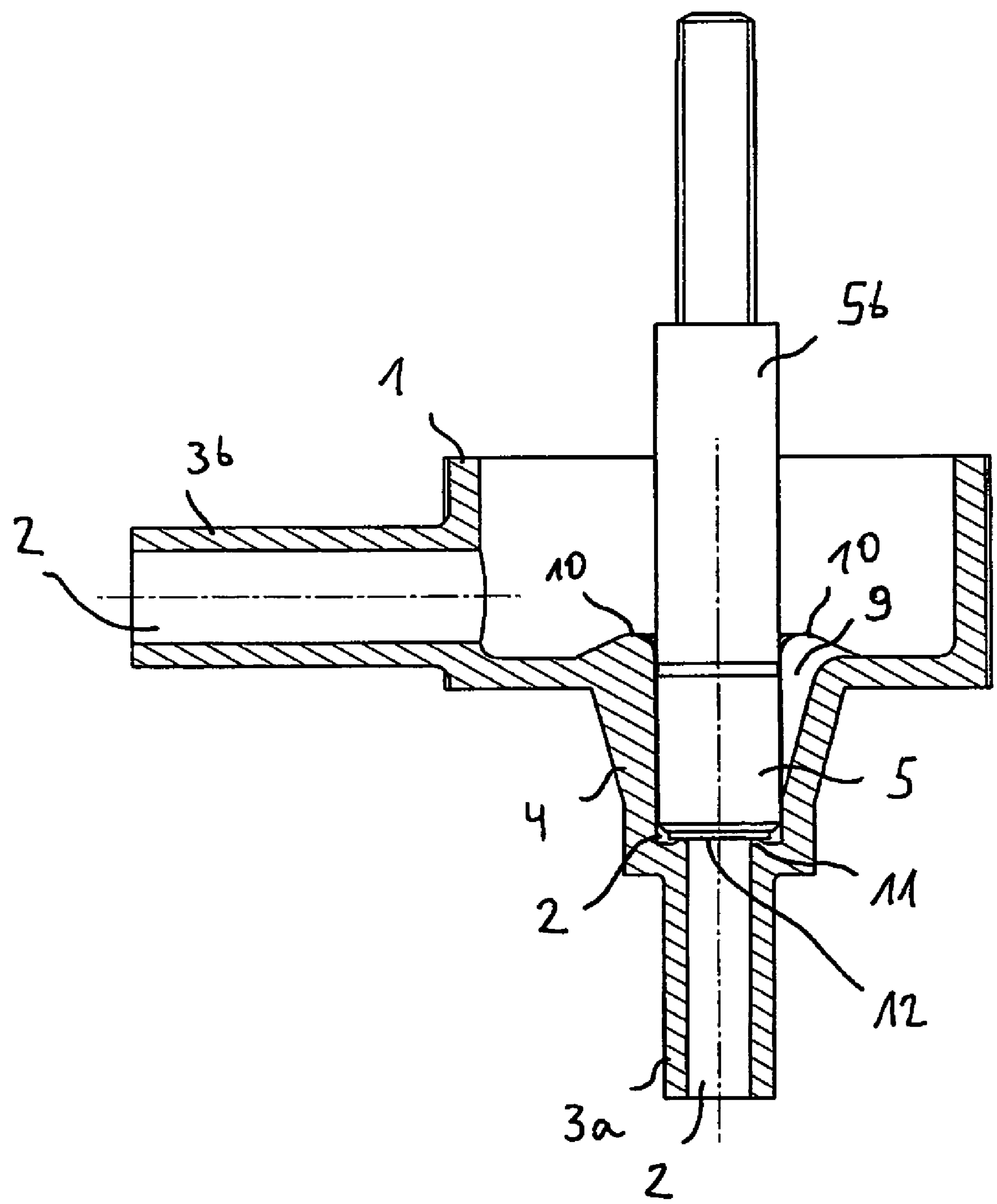
FIG. 3 shows a flow connector according to FIG. 2, whereby the plug is connected to an armature.

FIG. 3 shows the flow connector according to FIG. 2, whereby an armature 5*b* is associated with the plug. By means of the armature 5*b*, the plug 5 can be moved electromagnetically and, in particular, it can be positioned in a flow-regulated manner. Here the height of lift is proportional to the applied flow.

In FIGS. 2 and 3, a gasket 12 that rests on the seat 11 is associated with the plug 5. The gasket 12 can be configured as an elastomeric gasket.

Figure 4:
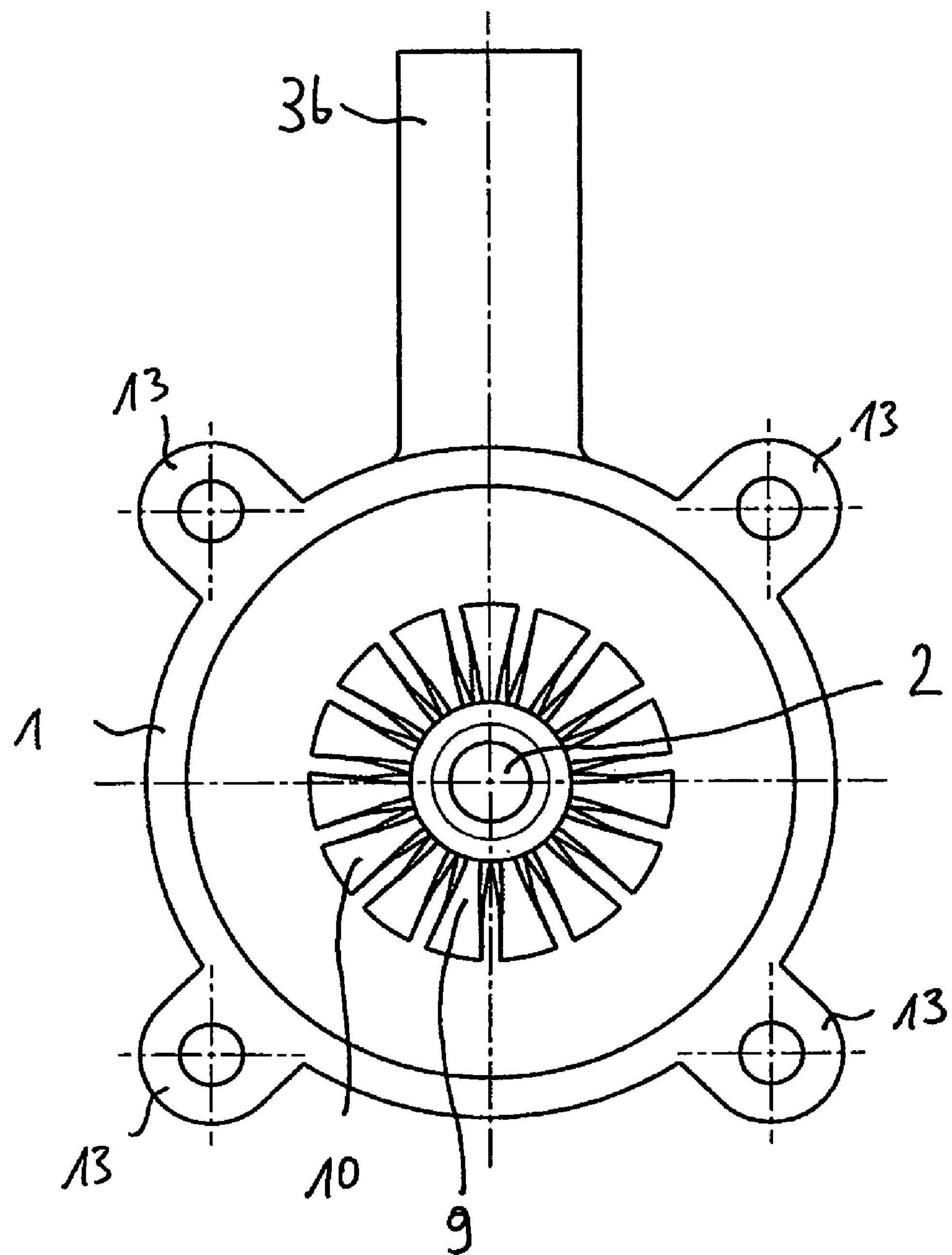
FIG. 4 shows a top view of the flow connector according to FIG. 1.

FIG. 4 shows a top view of the flow connector according to FIG. 1. Flange sections 13 that allow the arrangement of the flow connector on the housing of a solenoid valve are associated with the body 1. FIG. 4 shows the star-shaped arrangement of the guide webs 9 that have rounded-off end zones 10. FIG. 4 also shows the second port 3*b* that, together with the first port 3*a* and the opening area 4, forms a flow channel 2. Here, the ports 3*a*, 3*b* function as flow-guiding ports.

Figure 5:
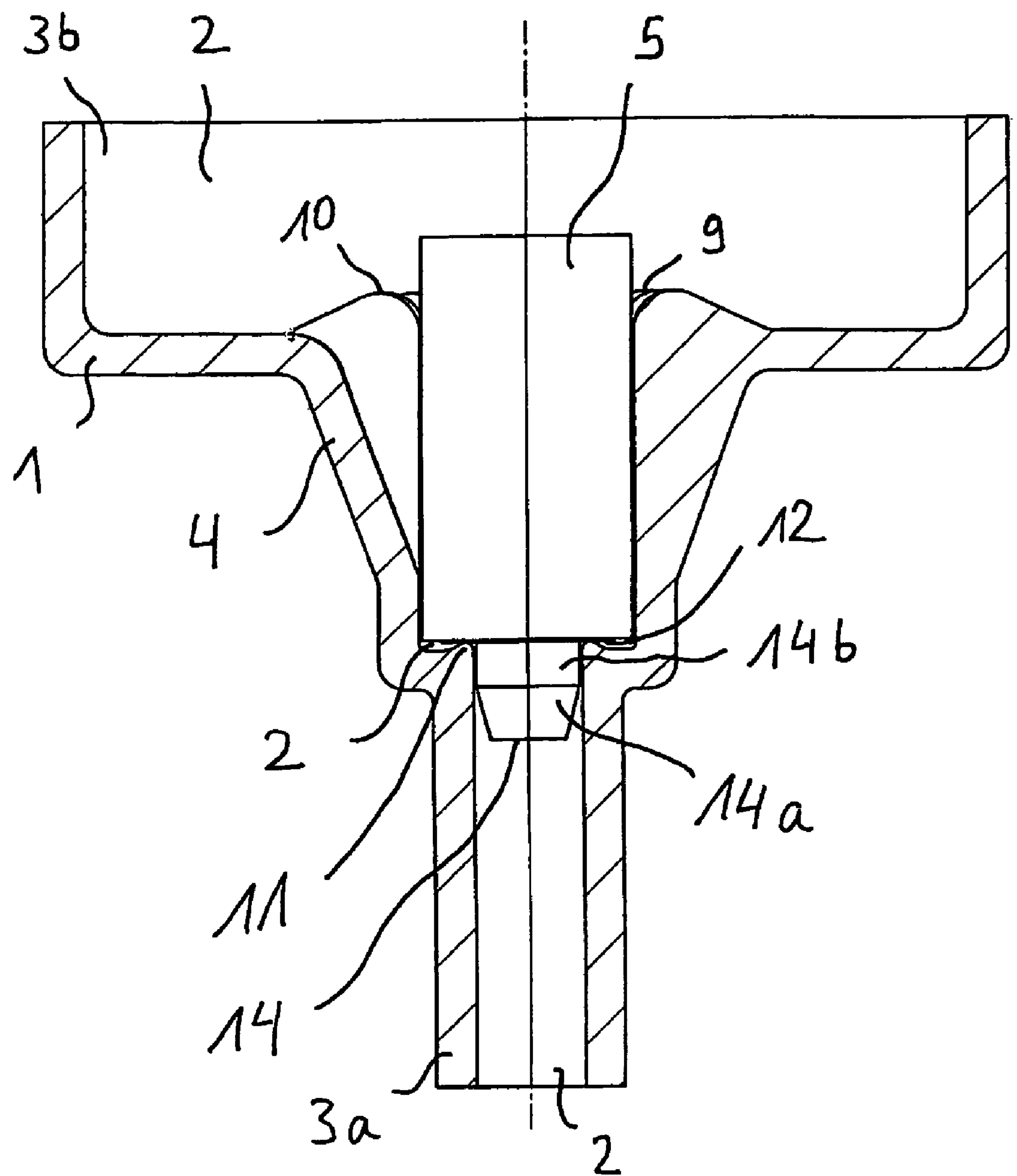
FIG. 5 shows a flow connector with a plug having a guide cone.

FIG. 5 shows a flow connector with a plug 5 having a guide cone 14 that consists of a cylindrical section 14*b* and a truncated-conical section 14*a*. The section 14*a* could also have a conical geometry that differs from the truncated-conical shape. The plug 5 rests on the seat 11 and, together with it, encloses a gasket 12.

Figure 6:
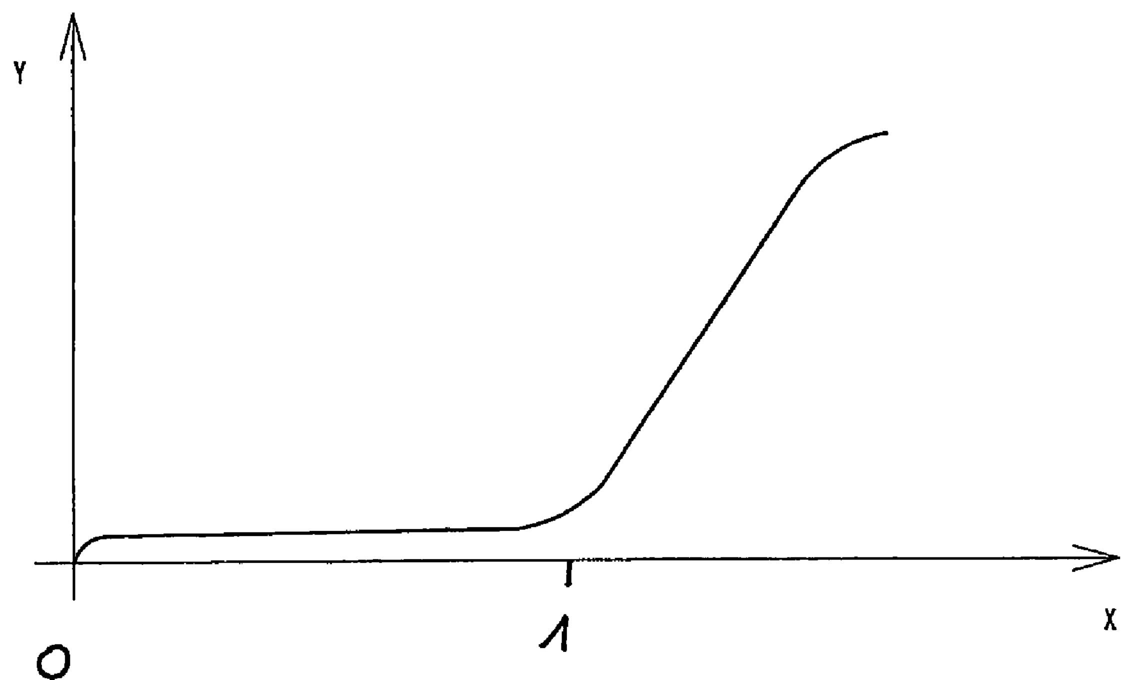
FIG. 6 shows a schematic depiction of the flow volume per unit of time through the flow channel as a function of the height of lift of the plug.

FIG. 6 shows a schematic depiction of the curve of the flow volume of fluid per unit of time through the flow channel 2 as a function of the height of lift of the plug 5. The flow volume per unit of time is plotted on the ordinate (Y) and the height of lift is plotted on the abscissa (X).

It can be seen that, when the plug 5 is moved out of the closed position (designated with 0) to the end of the height of lift 7 (designated with 1), the flow volume per unit of time is virtually constant.

As soon as the outer wall of the plug 5, together with the inner wall of the opening area 4 and the guide webs 9, forms the flow channel 2 along the second height of lift 8, the cross section surface area 6 increases almost proportionally to the height of lift of the plug 5. This results in a virtually proportional increase in the flow volume per unit of time through the flow channel or cross section surface area 6.

In conclusion, special mention should be made of the fact that the embodiments selected simply at random above serve merely to elucidate the teaching according to the invention but that the latter is not limited to these embodiments in any way whatsoever.

What is claimed is:

1. A flow connector for a valve, comprising:

a body having a flow channel, the body including a first port, a second port, an opening area to receive a movable plug and a plurality of guide webs arranged in the opening area;

wherein the first and second ports are capable of being flow-connected through the opening area;

wherein the cross section surface area of the flow channel in the opening area is configured to be constant along a first height of lift and to be variable along a second height of lift;

wherein the constant cross section surface area along the first height of lift allows for a constant flow rate through the flow channel independent of the height of lift, and wherein the variable cross section surface area along the second height of lift allows for a variable flow rate through the flow channel dependent on the height of lift; and wherein said guide webs taper in at least one direction and are arranged in the opening area along the second height of lift.

2. The flow connector as recited in claim 1, wherein the flow channel is configured cylindrically along the first height of lift.

3. The flow connector as recited in claim 1, wherein the flow channel is configured conically along the second height of lift.

4. The flow connector as recited in claim 1, wherein the guide webs taper in the axial direction.

5. The flow connector as recited in claim 1, wherein the guide webs taper in the radial direction.

6. The flow connector as recited in claim 1, wherein the guide webs have rounded-off end zones.

7. The flow connector as recited in claim 1, wherein a seat is formed in the opening area.

8. The flow connector as recited in claim 1, wherein a plug is movably mounted in the opening area.

9. The flow connector as recited in claim 8, wherein the plug has a gasket.

10. The flow connector as recited in claim 8, wherein the plug has a guide cone.

11. A solenoid valve comprising a flow connector as recited in claim 1.

12. The solenoid valve as recited in claim 11, wherein the solenoid valve is placed in a motor vehicle.

13. The solenoid valve as recited in claim 12, wherein the solenoid valve is a tank regeneration valve.

* * * * *